Nov. 11, 1941.   J. W. GREER   2,262,640
CONFECTIONERY DEPOSITING MACHINE
Filed Nov. 12, 1940   8 Sheets-Sheet 1

Nov. 11, 1941.   J. W. GREER   2,262,640
CONFECTIONERY DEPOSITING MACHINE
Filed Nov. 12, 1940   8 Sheets-Sheet 5

Nov. 11, 1941.     J. W. GREER     2,262,640
CONFECTIONERY DEPOSITING MACHINE
Filed Nov. 12, 1940     8 Sheets-Sheet 7

Fig. 9

Inventor:
Jesse W. Greer
Rowland V. Patuck
by Attorneys

Nov. 11, 1941.   J. W. GREER   2,262,640
CONFECTIONERY DEPOSITING MACHINE
Filed Nov. 12, 1940   8 Sheets-Sheet 8

Patented Nov. 11, 1941

2,262,640

UNITED STATES PATENT OFFICE 2,262,640

CONFECTIONERY DEPOSITING MACHINE

Jesse W. Greer, Cambridge, Mass., assignor to J. W. Greer Company, Cambridge, Mass., a corporation of Massachusetts Application November 12, 1940, Serial No. 365,196

21 Claims. (Cl. 107—1)

This invention relates to confectionery machinery, and more particularly to a machine for depositing confectionery on cookies, biscuits, or other edible units.

The chief object of the invention is the provision of a machine of this class which is rapid in operation without being inaccurate—accuracy being the guarantee of avoiding waste from rejects. A further object is the provision of a machine which is adapted for use in the manufacture of a variety of products depending upon the mechanisms included in the machine which are utilized and their particular adjustments. It is also an object to provide a machine which has the capacity for a continuous output of different confections—i. e., having different kinds of deposits—whereby an assortment of units may be packed directly from the output without resort to two machines, repacking, or change in operation.

By and large the machine may be described as a depositing machine capable of depositing on continuously moving units such as cookies different confections of semi-fluid consistency, such as jelly, marshmallow and the like, either one after the other or simultaneously or both, and amounting in some cases to deposits of considerable diameter and height and of pleasing, symmetrical and uniform contour.

To these ends, the machine includes a conveyor for edible units which may be advanced continuously along a fixed path, preferably in a horizontal plane. With such continuous operation and the movement of the belt through a fixed path, inadvertent displacement of the units on the belt, such as is caused by rapid intermittent operation or by up and down motion of the belt, as heretofore proposed, is precluded.

With such improved unit advance, one or more hoppers and associated feeding mechanisms are provided and the discharge nozzles of these feeding mechanisms not only move back and forth along the belt, but also up and down relative to the belt to permit a relative diverging movement between the nozzles and the units positioned on the belt to aid in shaping the deposit during the depositing operation, and to insure clean breaking of the material when the flow has ceased, without disturbing the shape of the deposit.

The forward motion of the nozzles is such that the horizontal component is the same in speed and direction as the motion of the belt and is controlled by a novel driving mechanism which brings the nozzles to belt speed quickly and maintains the horizontal speed of the nozzles in unison with the belt speed during a relatively long forward stroke to allow a substantial deposit to be properly shaped. Waste motion of the nozzles is therefore confined almost entirely to the back stroke, with the depositing pumps operating with the commencement of the forward stroke and continuing, if desired, until the end of the forward stroke.

Operation of valves, pumps and cut-offs associated with the hoppers and nozzles is timed with relation to the advance of the nozzles and is effected by novel controls. In addition, in the preferred embodiment, each hopper is provided with a plurality of nozzles so positioned that simultaneous deposit is made at intervals along the belt, whereby the output of the machine may be two or more rows of cookies for each cycle of the depositing mechanism. A further feature of the machine is the novel support for the nozzles, which support minimizes the power required to move the nozzles away from the cookie units and belt during the depositing operation. Other features of importance are the simple and effective control means for operating the valves, pumps and cut-offs and the adjustment mechanisms associated therewith which permit, by adjustment during operation, variations in the amount and rate of deposit of one or more types of deposited material.

These and other objects of the invention will be more fully understood in connection with the description herein given when taken in connection with the accompanying drawings, in which.

As shown in the drawings, especially Fig. 1, the main elements of the machine are indicated as follows:

A indicates a cookie stack and feeding mechanism for the cookies; B indicates a first depositor for, say jelly; C indicates a second depositor for, say marshmallow; D indicates a wiping mechanism, and all these mechanisms A, B, C and D are mounted for operation above a continuously moving belt E which supports advancing cookies F.

The cookies or other units are thus adapted to be fed onto the belt E from feeding mechanism A, and as they pass longitudinally of the machine they receive first a deposit of jelly at B, then a deposit of marshmallow at C, are then wiped at D, after which they may be passed from the belt E onto an abutting conveyor, to be passed through a topping and/or coating machine, a cooling unit, and then directly packed.

Figure 2:
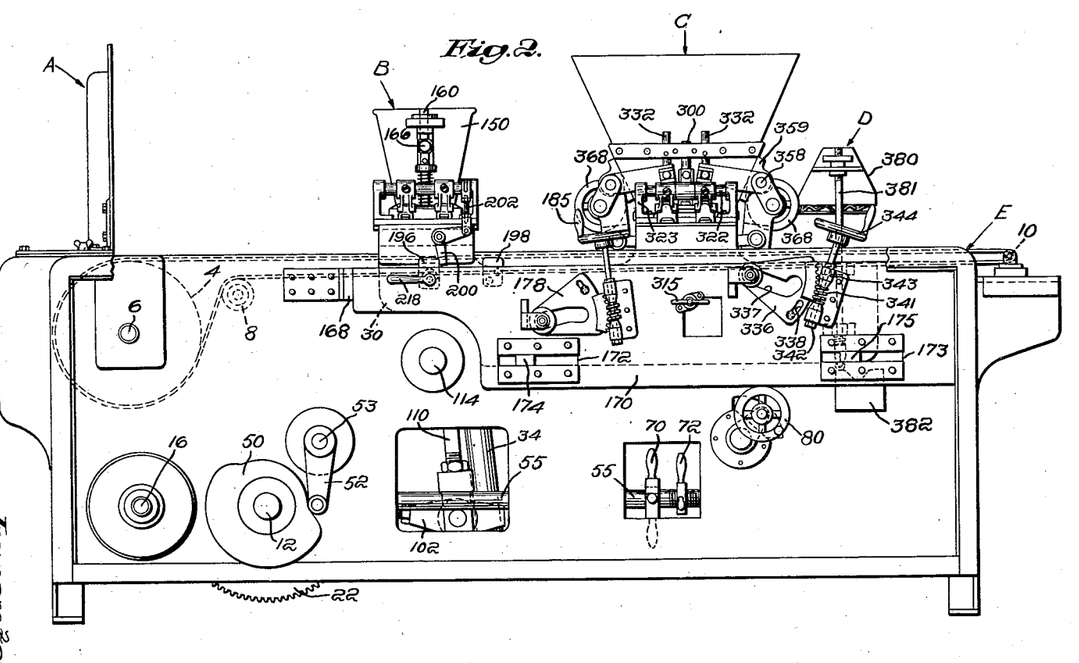
Fig. 2 is an elevational view of the machine, with the side guard shown in Fig. 1 removed.
Figure 3:
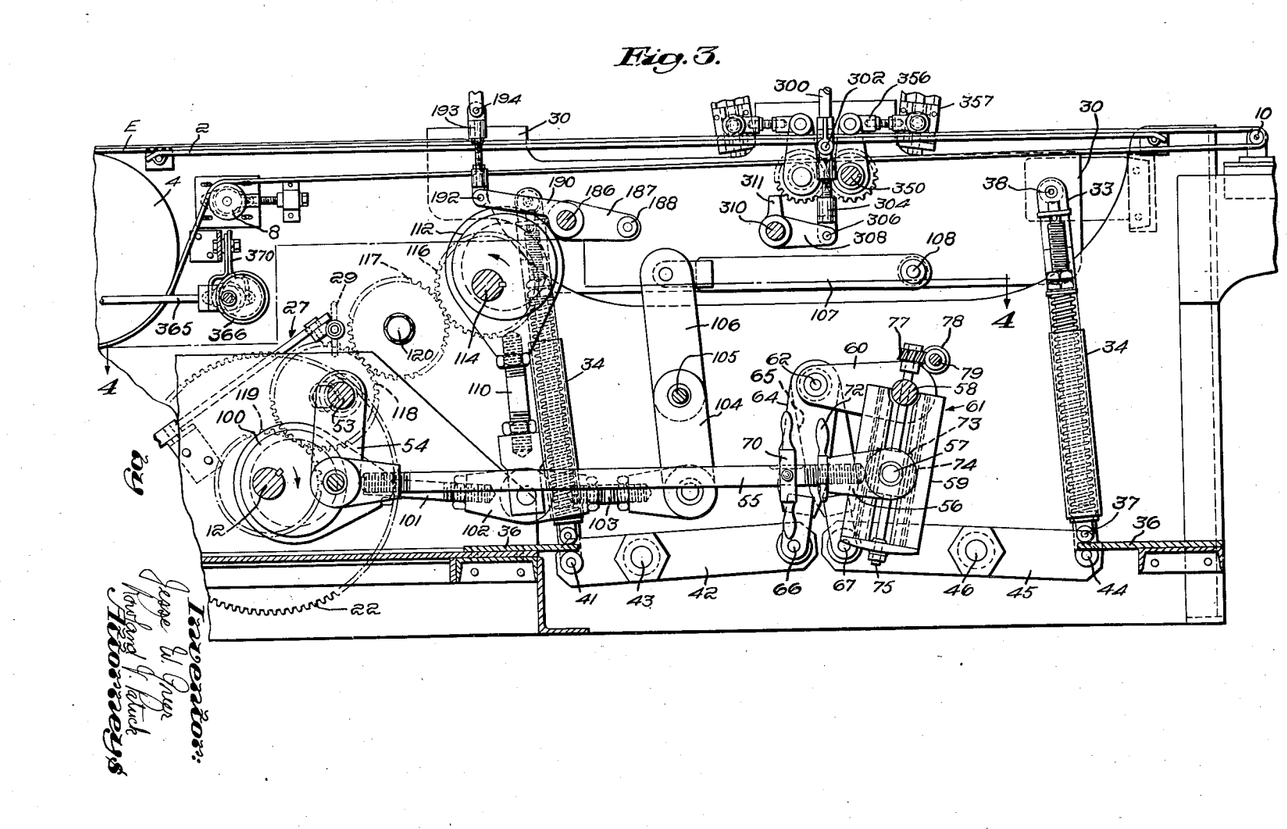
Fig. 3 is a longitudinal cross-sectional view along the right hand side of the machine with portions of the machine broken away.

The belt E extends the length of the machine, and during its upper traverse it is supported by a fixed plate 2 (Fig. 3), which is stationary with respect to the frame of the machine. As shown in Figs. 2 and 3, the belt E is driven from a drum 4 journaled in the frame of the machine on a shaft 6. As usual an idler roll 8 is provided to increase the amount of wrap on the drive drum 4, and at the rear of the machine the belt passes around another roll 10. As indicated in Fig. 3, the idler 8 may be adjusted longitudinally of the machine by a screw adjustment to vary the tension of the belt E.

Figure 4:
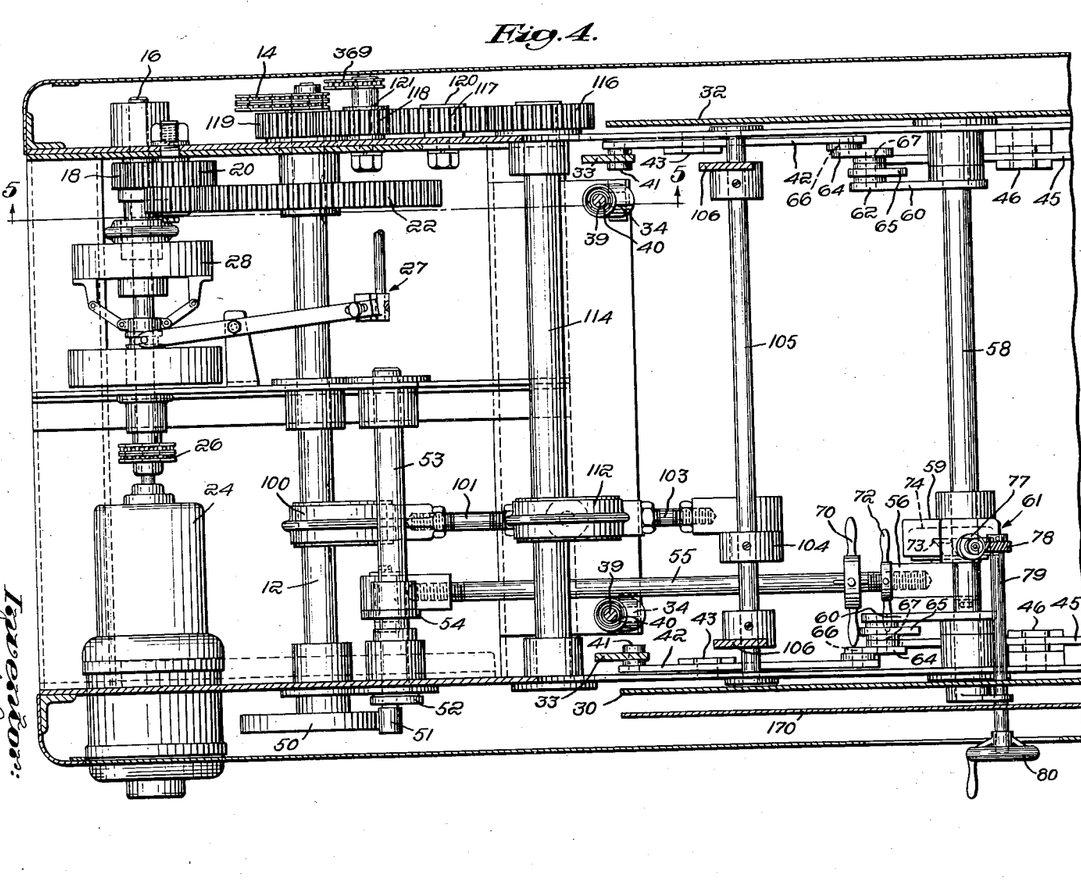
Fig. 4 is a cross-sectional view taken along the line 4—4 of Fig. 3.
Figure 5:
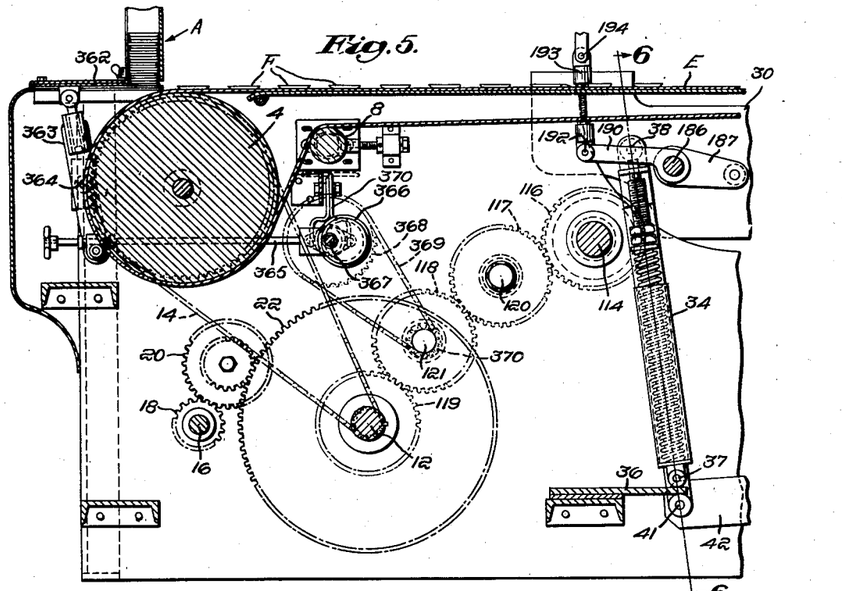
Fig. 5 is a detail of certain of the driving mechanism.

Referring to Fig. 5, the drive drum 4 is driven from a shaft 12 through a chain 14 connecting two sprockets mounted respectively on shafts 6 and 12. As shown in Figs. 4 and 5, the shaft 12 is driven from a main drive shaft 16 through reduction gears, including a pinion 18 on shaft 16, an intermediate gear 20, and a spur gear 22 mounted on shaft 12.

Main drive shaft 16 may be driven from a variable speed motor, diagrammatically shown in Fig. 4 at 24, which is connected with the shaft 16 through a flexible coupling 26 and a friction clutch 28. The clutch can be operated by the usual linkage 27 from control handle 29 shown in Figs. 1 and 3.

Figure 1:
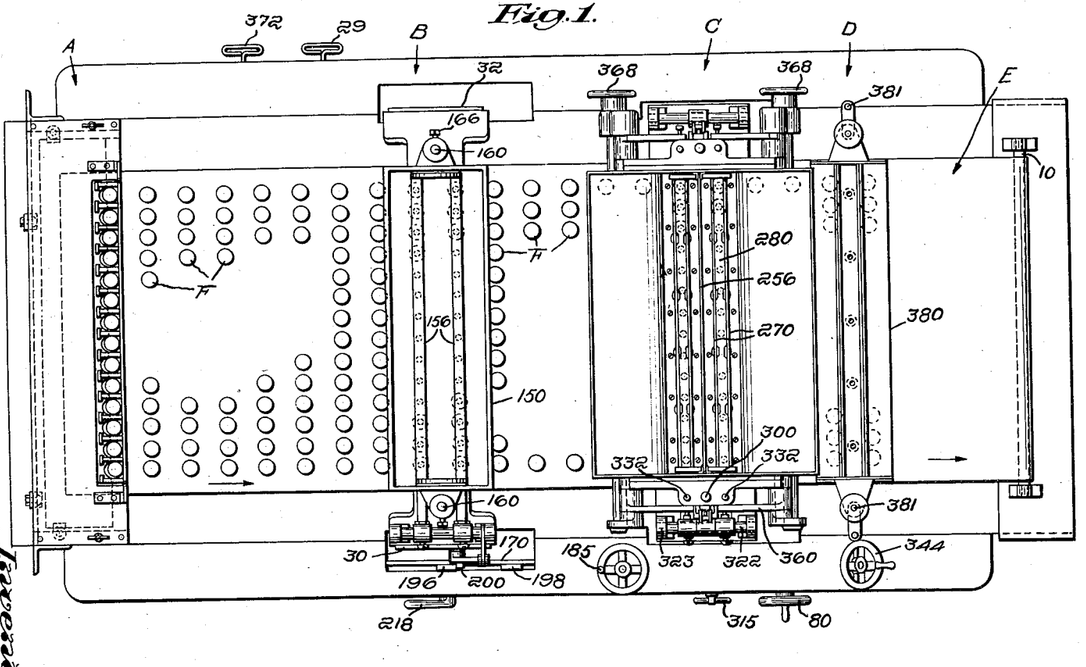
Fig. 1 is a plan of the machine, showing the position of cookies during operation.

Turning now to the hoppers B and C, each of these hoppers is mounted on a carriage which includes a pair of side plates 30 and 32 (Figs. 1, 2 and 4). These side plates are supported for movement along an orbital path on four oscillating arms 33, two of which are shown in Fig. 3, an identical pair supporting the plate 32 at the other side of the machine. The arms 33 are pivotally connected to the plates 30 and 32 at four points by the pivotal connections 38. In operation, these arms 33 are cyclically raised and lowered to impart the vertical components of motion of the carriage in its movement along the orbital path.

Figures 6, 12, 13:
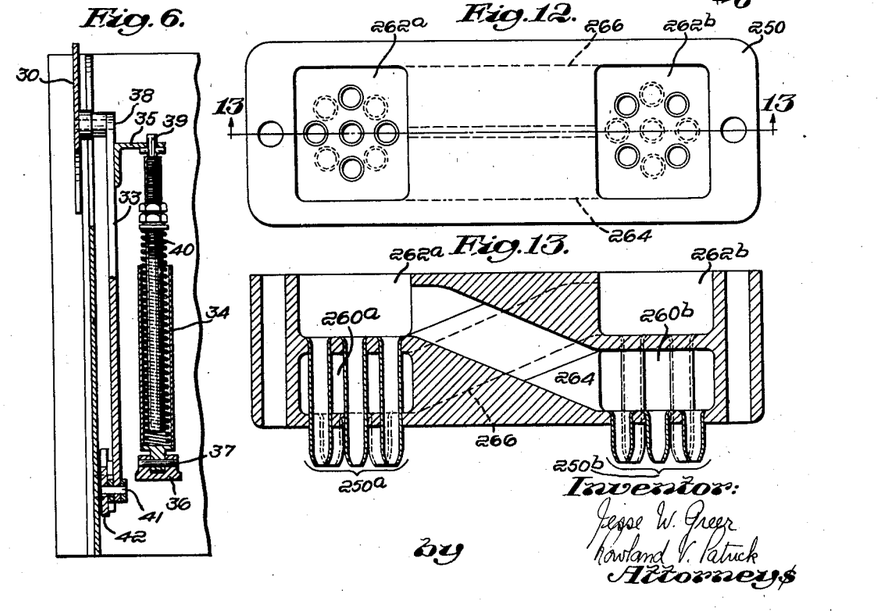
Fig. 6 is a cross-section taken along the line 6—6 of Fig. 5, showing a detail of one of the supporting elements for the hoppers.
Fig. 12 is a plan of a nozzle bar.
Fig. 13 is a cross-section taken on lines 13—13 of Fig. 12, showing opening 264 in full.

In view of this vertical motion of the arms 33, I provide additional supporting elements for the carriage which will relieve some of the load placed on the mechanism which raises these arms. For this purpose each arm 33, as shown in detail in Fig. 6, carries a bracket 35 against which a rod 39 is urged upwardly by the action of a surrounding compression spring 40 against an adjustable nut screwthreaded on the rod 39. The spring 40 is seated in a tube 34 pivotally supported at its lower extremity at 37 on a bracket 36 fixed to the frame of the machine. The adjustment of the nut on rod 39 is such that the spring 40 carries any desired portion of the load of the carriage.

The mechanism for driving arms 33 is shown in Figs. 3 and 4. The lower end of each arm 33 is pivotally connected to a rocker arm. Thus, the forward pair of arms 33 are pivotally connected at points 41 to rocker arms 42 welded to rocker shafts 43, journaled in the frame of the machine. Likewise the two rear arms 33 are pivotally connected at points 44 (Fig. 3) to rocker arms 45, welded to rocker shafts 46 also journaled on the frame.

The rocker arms 42 and 45 are operated from the main cam shaft 12, through a chain of mechanism as follows:

The shaft 12 (Fig. 4) carries on its outer end a cam 50, which acts on a cam follower 51, mounted on an arm 52 fixed to a shaft 53 extending transversely of the machine as shown in Fig. 4. Interiorly of the frame of the machine, an arm 54 similar to the arm 52 is fixed to shaft 53, as shown in Fig. 3, and carries by a pivotal connection at its bottom end a connecting rod 55 extending rearwardly of the machine. The rear end of the connecting rod 55 is screwthreaded into a block 56 held on a pin 57 extending from an adjustable link mechanism generally indicated at 61. This mechanism 61 is connected for rocking movement about the axis of a rocker shaft 58 extending across the machine, to which is also fixed an arm 60 which carries by a pivotal connection at 62 a pair of downwardly extending links 64 and 65. The links 64 and 65 are respectively connected with the rocker arms 42 and 45 at points 66 and 67. The parts 60, 64 and 65 are duplicated on both sides of the machine as shown in Fig. 4.

Thus by this train of mechanism, the connecting rod 55 reciprocates, thereby imparting to the rocker arms 42 and 45 a rocking movement which is transmitted through the arms 33 into a rise and fall movement of the plates 30 and 32 carrying the hoppers B and C. The configuration of cam 50 is shown in Fig. 2 and is such that a gradual rise of the carriage plates takes place, then a sudden rise, then a high point dwell and then a fall, this motion being modified by a simultaneous reciprocal motion imparted to the carriage as will be later described.

In order to control the amount of rise and fall of the hopper carriage, and the initial point of rise thereof, two adjustments are incorporated in this mechanism, as follows:

First, the connecting rod 55 may be changed in length by reason of the opposite pitch of screw threads at its ends. This adjustment is more readily accomplished by positioning a hand wheel 70 on the connecting rod 55, and upon adjustment the connecting rod is held in position by a lock wheel 72, shown in Figs. 1, 3 and 4. This adjustment controls the horizontal plane of the lowest point in the carriage fall. In addition, the link 61 includes mechanism whereby the distance between the axis of the shaft 58 and the axis of the pin 57 may be varied. To accomplish this, pin 57 is carried by a block 73 slidably mounted in guides 74 in a member 59 which forms part of the link 61. A shaft 75 is screwthreaded in the block 73, extends loosely through the shaft 58, as shown in Fig. 3, and carries at its top a pinion 77 which is geared to a pinion 78 on a countershaft 79, carrying a hand wheel 80 extending at the side of the machine. This adjustment thus controls the amount of rise.

In addition to the rise and fall motion imparted by the mechanism just described, the hopper carriage receives a motion longitudinally of the machine by reason of a second reciprocal drive from the cam shaft 12. This drive includes an eccentric 100 mounted on the shaft 12, the eccentric strap of which is connected by a connecting rod 101 through a knuckle joint 102, and a second connecting rod 103, to an arm 104 fixed to a shaft 105 journaled in the frame of the machine. Shaft 105 also carries an arm 106 pivotally connected to an arm 107 pivoted to the side plate 30 of the movable carriage at 108. As shown in Fig. 4, the shaft 105 extends transversely of the machine, and, as indicated, the arms 106 and 107 are duplicated on the other side of the machine to connect the drive to carriage plate 32. While an eccentric of the type 100 will impart a reciprocation to the carriage, the acceleration of the carriage would not be maintained and its speed would not be uniform throughout the forward stroke. It is therefore necessary to incorporate mechanism which will modify the acceleration of the carriage at the beginning of the forward stroke and maintain its speed uniform during the major portion of the forward stroke so that it can move with a horizontal component in unison with the motion of the continuously moving belt. The novel mechanism incorporated in the machine for this purpose includes a drive which is adapted to change the effective length of the connecting rods 101 and 103 by periodically lengthening and shortening the distance between their terminal pivot points during the operation. For this purpose the connecting rods 101 and 103 are broken by the knuckle joint 102, as previously described, and the connecting rods 101 and 103 are operated as a toggle by reason of a third connecting rod 110, pivotally connected to the knuckle joint 102, and driven by a second equalizing eccentric 112, mounted on a shaft 114 driven from shaft 12 through a train of gears 116, 117, 118 and 119, as shown in Fig. 4, gears 117 and 118 being mounted on stub shafts 120 and 121 respectively.

The relation of the throw of eccentric 100 with the throw of eccentric 112 is such that as eccentric 100 reaches its high point, equalizing eccentric 112 is 45° from reaching its low point. The toggle operating connecting rod thus operates to modify the acceleration at the beginning of the forward stroke by lengthening the effective length of the connecting rods 101 and 103 during the first 45° of the cycle, and then to progressively shorten their effective length during the remainder of the forward stroke, thereby maintaining the carriage movement substantially uniform during the major portion of the forward stroke.

Figures 7, 8, 14:
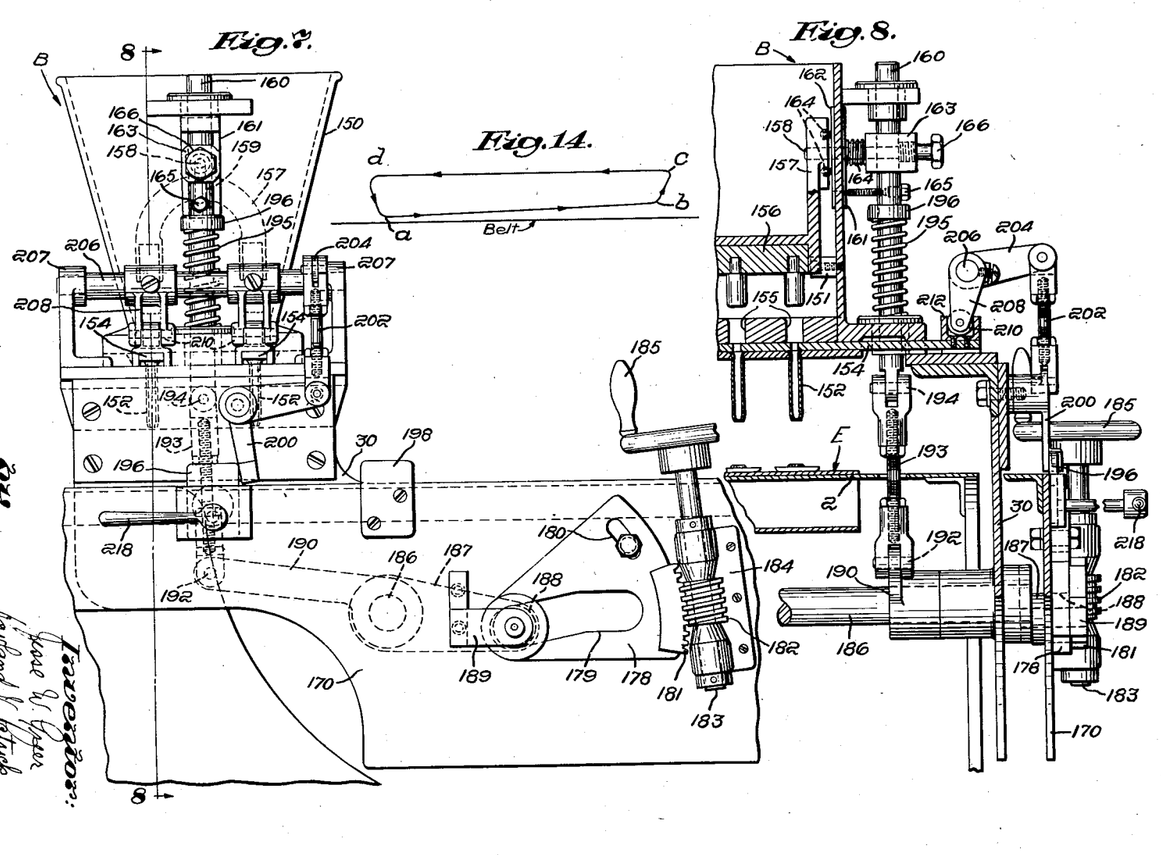
Fig. 7 is an elevation of one hopper in its position at the end of its back stroke.
Fig. 8 is a cross-section along the lines 8—8 of Fig. 7, with a portion of the hopper broken away and showing units in position on belt E.
Fig. 14 is a diagrammatic illustration of the path of movement of the hopper carriage.

By reason of the configuration of cam 50 and its relation to the cooperating eccentrics 100 and 112, the carriage formed by the plates 30 and 32 may be moved in an orbital path having a configuration substantially that shown in Fig. 14 relative to the belt E. As shown, the forward stroke of the carriage is along a substantially straight line path inclined upwardly with relation to the belt.

Turning now to the hopper assembly of the jelly hopper B, shown in Figs. 7 and 8, the hopper 150 is mounted on the side plates 30 and 32 of the reciprocating carriage. The hopper is provided at its bottom with a series of fixed nozzles 152 disposed in two rows as shown in Fig. 7. Above each lateral row of nozzles is mounted a cut-off plate 154, slidable laterally of the machine with relation to the nozzles, and having therein apertures adapted to align themselves with the nozzles and with corresponding ports 155 in the bottom of hopper 150. Internally of the hopper 150 is mounted a double pump unit 156, including at each end yokes 157, the pump unit having individual plungers corresponding to the positions of ports 155. The pump unit 156 is adapted for vertical reciprocation guided by a guide 151 (Fig. 8) by reason of its mounting in the hopper. Since the mounting is identical at both sides of the machine, it will suffice to describe the mounting shown in Fig. 8. The yoke 57 is supported by a pin 158, projecting through a vertical slot formed in the side of the hopper, and through a block 163 slidably mounted on a rod 160 mounted in bearings fixed on the hopper 150. As shown, the rod 160 also has a vertical slot 159 through which pin 158 passes, permitting a fixed adjustment of the block 163 on the rod 160 by the set screw 166. In order to prevent leakage through the slot 159, two plates 161, 162 are mounted on each side of the hopper wall and are held at each side by springs 164 (Fig. 8), and by a screw 165, all of which move with the pump mechanism.

The hopper B therefore has two mechanisms which require timed operation with relation to the movement of the belt E. First the cut-off plates 154 must be reciprocated to open and close the ports, and secondly, the pump 156 must be vertically reciprocated in order to pump jelly while the cut-off plates 154 are in the open position shown in Fig. 8.

Both of these operations are controlled from a cam plate 170 (Fig. 2), which is mounted on the right side of the machine for vertical movement in association with the movable carriage, but which is prevented from movement longitudinally of the machine by reason of abutments fixed to the frame, one of which is shown at 168 in Fig. 2. The vertical motion of the cam plate 170 is imparted by the presence of horizontal slots 172 and 173 in the plate 170 (Fig. 2) through which project tongues 174 and 175 fixedly secured to the plate 30 of the movable carriage. These tongues 174 and 175 carried by plate 30 are therefore free to move longitudinally of the machine relative to the cam plate 170 in the slots 172 and 173 but will lift the cam plate 170 with the plate 30 as rise and fall motion is imparted to the carriage by the mechanism heretofore described.

In order to operate the cut-off mechanism and pump mechanism of the jelly hopper, the cam plate 170 is provided with two control mechanisms.

First, as shown most clearly in Fig. 7, the plate 170 is provided with an adjustable cam element 178 having a cam slot 179. The element 178 is pivoted at its apex on a bracket 189 fixed to the plate 179, is guided in a pivotal adjustable movement by a pin and slot arrangement shown at 180, and is provided with teeth 181 which mesh with a worm 182 fixed on a shaft 183 journaled in bearings 184 fixed to the plate 170. The shaft 183 has a hand wheel 185, by which the cam element may be adjusted about its pivot, thus varying the position of the slot 179.

The movable carriage has journaled therein a transverse rocker shaft 186, carrying at the right side of the machine an arm 187, having a cam roller 188 which projects outwardly for movement in the cam slot 179.

At each side of the machine, the rocker shaft 186 carries a forwardly extending arm 190 pivotally connected at 192 to a connecting rod 193, which in turn is pivotally connected at 194 to the rod 160, which operates the pump 156.

Operation of the pump through this mechanism is against a compression spring 195 acting against a collar 196 fixed on rod 160, so that the pump 156 is normally urged upwardly, but as carriage 30 advances, the cam roller 188 travels along slot 179, thereby rocking shaft 186 and drawing rod 160 downwardly to bring the plungers of pump 156 into the ports 155. It will be understood that the rocker shaft 186 and cam element 178 rise together during the operation, but have a horizontal movement relative to one another because of the operation of plate 30 and 170 as previously described. Since the linkage from shaft 186 to rod 160 is duplicated at the other side of the machine, one side only has been shown, in Figs. 7 and 8.

Turning now to the operation of the cut-off plates 154, the cam plate 170 carries two abutments, 196 and 198. Pivotally mounted on the hopper carriage is a bell crank lever 200, one arm of which is a trigger finger, which moves in a path between the abutments 196 and 198 during the reciprocation of the movable carriage. The other arm of the bell crank lever 200 is connected to a connecting rod 202, connected at its other end to an arm 204, fixed to a rocker shaft 206 mounted in bearings 207 on the hopper carriage.

The rocker shaft 206 is provided with duplicate bifurcated arms 208, each of which has at its lower end a roller 210 which is held between two abutments 212 fastened to a cut-off plate 154.

Thus as the carriage 30 moves forwardly the trigger finger 200 moves towards abutment 198 and as the trigger 200 is tripped by abutment 198 the linkage described causes a clockwise movement of the rocker shaft 206 as seen in Fig. 8, thereby moving the cut-off plates 154 to closed position. Thereafter, as the carriage returns the trigger finger 200 is tripped by the abutment 196, thereby rotating the rocker shaft 206 counterclockwise, and moving the cut-off plates 154 back to the open position shown in Figs. 7 and 8. It will be understood that the abutments 196 and 198 rise and fall with the trigger finger 200, through the action of the tongue and slot arrangement between plate 30 and plate 170, previously described.

In order that the whole machine may be operated without using the hopper mechanism B, the abutment 196 is mounted for vertical sliding movement on the cam plate 170 and is held by a cam connected with a manual crank 218. By moving the crank 218 through an arc of 90°, the abutment 196 may be dropped out of the path of the trigger finger 200, thereby preventing the opening of cut-off mechanisms 154 on the back stroke of the carriage. At the same time by adjustment of the hand-wheel 185, the cam slot 179 can be brought to such position that the pump mechanism 156, etc., will not operate effectively.

Figure 10:
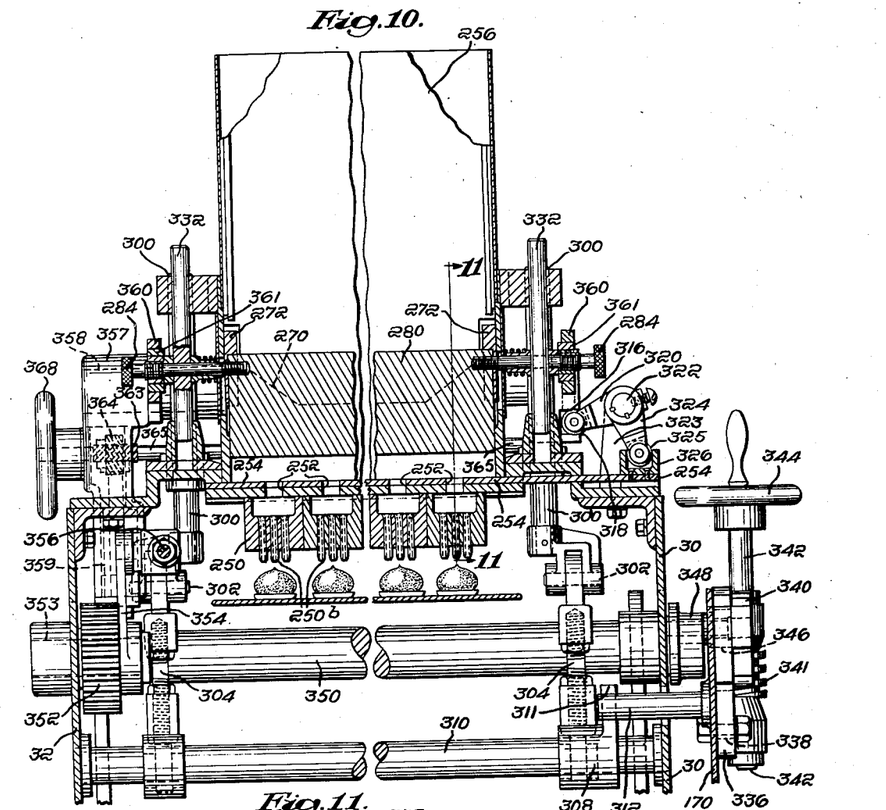
Fig. 10 is a cross-sectional view taken along the lines 10—10 of Fig. 9.

Turning now to the hopper mechanism C which is intended primarily for the depositing of marshmallow, this hopper C is likewise mounted on the carriage plates 30 and 32, as shown in Fig. 10.

The hopper C is provided with a series of nozzle elements 250, having groups of nozzles, each group being aligned with a port 252 in the bottom of the hopper. As with the jelly mechanism B, there are two lateral rows of nozzle groups, each element 250 having two groups, and each of the groups being spaced longitudinally and laterally of the machine the same distances as the nozzles of hopper B. Above the ports 252 there are provided two laterally reciprocable cut-off plates 254.

While the hopper C might contain one kind of marshmallow only, which is fed by the pumps through both rows of nozzles, I have designed hopper C so that it may be divided by a partition 256 (Figs. 1 and 11), to accommodate one color of marshmallow on one side of the partition and another color of marshmallow on the other side. With this arrangement, the color of marshmallow fed through the forward row of ports may be different from that fed through the rear row of ports, as is clear from Fig. 1, and, accordingly, the machine will operate to deposit one color of marshmallow from one row and a second color from the next row, and then will repeat so that the output of the machine will be laterally disposed rows of cookies, every other row being identical and intermediate rows having a different color of marshmallow.

Figure 11:
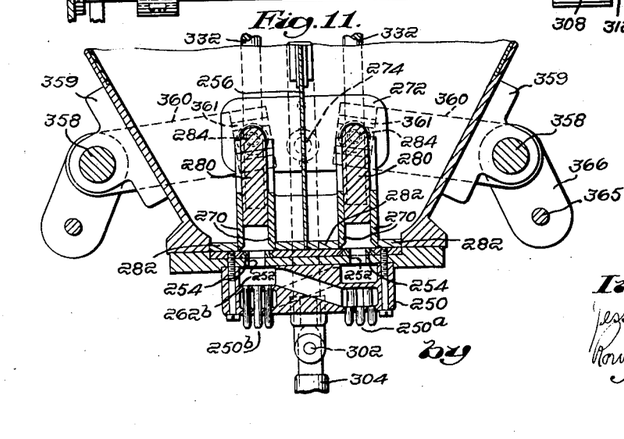
Fig. 11 is a cross-sectional view taken along the lines 11—11 of Fig. 10.

However, in the embodiment shown in the drawings, I have affixed a particular type of nozzle element 250 adapted to deposit on each cookie a mixture of the two colors of marshmallow. This element is shown in detail in Figs. 12 and 13. As there shown, the nozzle element includes the two spaced groups of nozzles, 250a and 250b, each group consisting of nine individual nozzles. Of the nozzles in the group 250a, four communicate with a lower chamber 260a and five communicate with an upper chamber 262a. Of the nozzles in the group 250b, five nozzles communicate with a lower chamber 260b, and four with an upper chamber 262b. The chambers 262a and 262b are inlet chambers, which communicate, when the element is positioned in the machine, with two longitudinally aligned ports in the bottom of the hopper C, as shown in Fig. 11. The nozzle element also has two inclined passageways, one being shown as 264, the other as 266, in Figs. 12 and 13, the passageway 264 connecting the chamber 262a with the chamber 260b, and the passageway 266 connecting the chamber 262b with the lower chamber 260a. In this manner, five of the nozzles in each group will be supplied with marshmallow from one side of the partition, and four of the nozzles in each group will be supplied with marshmallow from the other side of the partition, every cookie thus receiving a mixture of the two kinds of marshmallow contained in the two sides of the hopper C.

Internally of the hopper C there are mounted both pumps and valves. The valves act as a double unit which includes four plates 270 (Fig. 11) extending transversely of the hopper, and being arranged in pairs, each pair being aligned with a row of ports 252 and adapted to move downwardly to a position as shown in Fig. 11 between valve seal plates 282. These plates 270 are suspended from yokes 272 disposed one at each end of the hopper, and each yoke is supported at each side of the hopper by a pin 274 projecting through a vertical slot 276 (Fig. 9) formed in the side of the hopper, and passing through a vertically slidable rod 300 mounted in brackets outside the hopper C. In order to prevent leakage through these slots, an arrangement similar to that previously described in connection with the jelly hopper B may be incorporated, and need not be further described.

In addition, the feed mechanism of hopper C includes independently operating pumps 280, each one of which is aligned with a row of ports 252. These pumps 280 are fitted, as shown in Fig. 1, inside the valve plates 270 for vertical movement relative thereto and are suspended for vertical movement from pins 284 also extending through slots in the sidewalls of the hopper, and likewise passing through vertically movable rods 332 mounted on the outside of each end of the hopper. As will be understood, the yokes 272 are properly slotted to permit the pins 284 to extend therebeyond and leakage may here also be prevented by the plate and spring arrangement described in connection with the hopper B.

Figure 9:
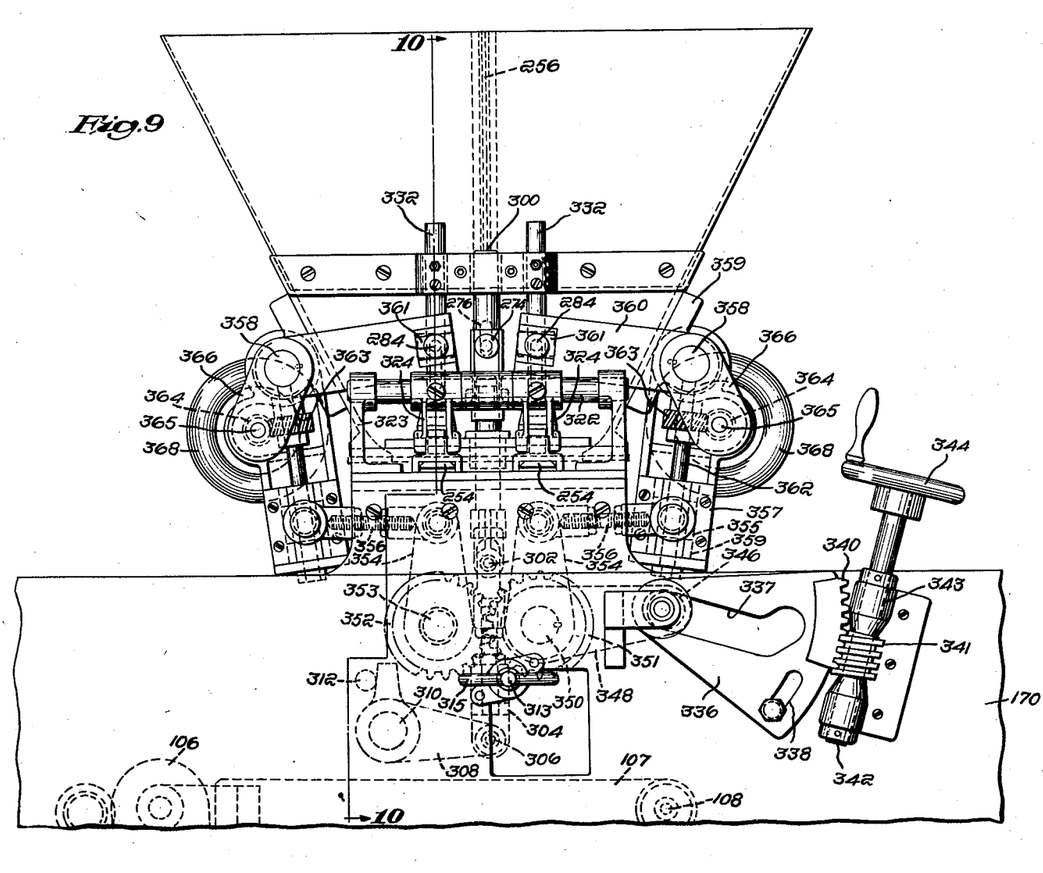
Fig. 9 is an elevational view of the other hopper in its position at the end of its back stroke.

The valves 270 are operated from the two center rods 300 mounted for vertical sliding movement in the sides of the hopper. The lower end of each rod 300 has a yoked pivotal connection at 302 (Fig. 10) with a link 304 which is pivotally attached at 306 to an arm 308 fixed to a rocker shaft 310 journaled between the side plates 30 and 32. At the right side of the machine this arm 308 is one arm of a bell crank lever, the other arm of which is a trigger finger 311, in the path of movement of which are two abutments 312 and 313 fixedly mounted on the cam plate 170 (Fig. 9).

The right hand rod 300 also carries a block 316 (Fig. 10) having a groove into which projects a roller 318 mounted on a bifurcated arm 320 adjustably fixed to a shaft 322 journaled in bearings 323 on the hopper carriage. On each side of its center the shaft 322 carries a downwardly projecting arm 324 (Figs. 9 and 10) each carrying at its end a roller 325 projecting between abutments 326 on the end of one of the cut-off plates 254.

In this manner, through the action of the trigger finger 311 on the abutments 312 and 313 the valves 270 and the cut-off plates 254 are operated in predetermined timed relation with the movement of the carriage longitudinally of the machine with relation to the cam plate 170. Thus, at the end of the back stroke of the carriage the trigger 311 is tripped by abutment 312, thereby moving the rod 300 downwardly, closing the valves, and opening the ports through movement of the cut-off plates to the right, as seen in Fig. 10. As the carriage reaches the end of its forward stroke the trigger is again tripped by the other abutment 313 and the valves are raised and the cut-off plates move to the left and close the ports 252. Suitable spring means may be incorporated to hold rods 300 in position during passage of the trigger finger between abutments 312 to 313 though the friction of the cut-off plates 254 has been found adequate.

In addition, for operating the pumps, the hopper carries the separate rods 332, two mounted at each side of the hopper. These rods are driven from a cam roller and slot arrangement carried by the carriage and by the cam plate 170 respectively, and similar to the cam element 178 previously described. Thus the cam plate 170 (Fig. 9) has pivotally mounted in a bracket thereon a cam element 336 having therein a slot 337 and guided by a tongue and groove arrangement 338. The cam element 336 is also provided with teeth 340 which mesh with a worm 341 fixed to a shaft 342 journaled in a bearing 343 supported on the cam plate 170. The shaft 342 carries a handwheel 344 for pivoting the cam element 336 about its pivot point on plate 170.

Projecting into the cam slot 337 is a cam roller 346 mounted on an arm 348 welded to a rocker shaft 350 journaled between side plates 30 and 32 and carrying at its opposite end a gear 351 meshing with a gear 352 mounted on a parallel stub rocker shaft 353 extending inwardly from plate 32. Each of the shafts 350 and 353 carries a fixed arm 354 extending upwardly and pivotally connected to a connecting rod 356 connected with an adjustable link 357 fixed to a shaft 358 journaled in bearings 359 across the outside of the hopper. Each of the shafts 358 carries two links 360 one at each side of the hopper and these four links all have a pivotal sliding connection at 361 with pins 284 carried in rods 332 so as to drive the pumps from each side of the hopper.

The adjustable links 357 are included in order to vary the initial position of the pumps at the commencement of their throw and are similar to the type of adjustment provided in the link mechanism 61 controlling the rise and fall movement of the carriage previously described, that is, the connecting rods 356 are fixed to pins held in blocks 355 mounted for sliding movement in guides 359. Screwthreaded through the blocks 355 are shafts 362 carrying pinions 363 meshing with worms 364 mounted on shafts 365 journaled in arms 366 which are fixed to the shaft 358. Each of the shafts 365 carries a handwheel 368. Thus by rotation of the handwheels 368 a block 359 carrying a connecting rod 356 may be raised or lowered with respect to the axis of a shaft 358, thereby varying the length of one of the links 357 with a resulting change in the starting position of the pump operated by that linkage.

In addition to the adjustment afforded by the adjustable links 357, the throw of the pumps 280 may be simultaneously controlled through adjustment of the cam element 336 by the handwheel 344, previously described. As will be seen, the particular inclination of the cam slot 337 with relation to the plate 170 will determine the amount of throw of the rods 332 and the connected pumps.

Finally, as with the jelly mechanism, the operation of the valves and cut-offs of the hopper C may be discontinued by moving the abutment 313 out of the path of the trigger finger 309. To permit this movement, the abutment 313 may be a sliding pin which extends through a bearing in the side of the plate 170, and terminates in an operating handle 315, shown in Figs. 1 and 9.

Returning now to the ejector mechanism A, this is of usual construction and includes a sliding plate 362, Fig. 5, of a thickness substantially less than the thickness of the cookies and adapted to reciprocate and feed the lowermost cookies in the stacks onto belt E at predetermined intervals. For this purpose the slide 362 is connected with a lever 363 which is rocked about a pivot 364 by a connecting rod 365 and eccentric 366 mounted on a shaft 367 which is rotated through a sprocket 368 connected by a chain 369 with a sprocket 370 carried by the shaft 121. A portion of the chain 369 is shown in Fig. 4.

Between the eccentric 366 and the gear 368 there is interposed a clutch mechanism 370 indicated in Figs. 3 and 5 so that the ejector mechanism may be placed out of operation without stopping the rest of the machine. A control handle for this ejector clutch is indicated in Fig. 1 at 372.

The wiping mechanism D (Fig. 2) comprises a vertically reciprocable unit 380 carried on vertical rods 381 at each side of the machine, which extend through brackets held on carriage plates 30 and 32. As shown in Fig. 2 the lower ends of these rods carry cam rollers which rest on cam paths 382 having the configurations shown and fixed to the frame of the machine. Thus with each forward stroke of the carriage the wiper unit D descends to flatten the top of two rows of coated units. By the end of the forward stroke of the carriage the rods 381 are stopped against downward movement and are raised with the carriage out of contact with the cams and do not return to the cams until the carriage is lowered at the beginning of the forward stroke. The unit 380 carries a water tank and beneath the tank is mounted a chamois which is kept moistened from the tank.

With the mechanisms thus arranged, the operation of the machine is as follows:

Cookies may be stacked upside down in the usual manner in the stacks of the ejector machine A. A quantity of jelly may be placed in the hopper B, and two kinds of marshmallow may be placed in the hopper C, one on each side of the partition 256. The clutch mechanisms 29 and 372 may then be thrown in, thus instigating operation of the ejector mechanism, advance of the belt E, and movement of the hopper carriage about its orbital path. The mechanisms controlling these three drives are such that the ejector plate 362 reciprocates twice while the hopper carriage moves once about its orbital path. The result is that cookies F are fed onto the belt in rows, the rows being spaced from each other and the units being spaced from each other in each row corresponding to the spacing of the nozzles of the jelly hopper and marshmallow hopper nozzles. The belt E is then advanced a distance equivalent to twice the distance between the centers of the positioned rows of cookies F with each cycle of the machine.

After the first row of cookies has reached a position beneath the second row of nozzles of the jelly mechanism, the jelly hopper pump control handle 218 may be thrown over to place the jelly cut-off mechanisms in operation, and the pump control handwheel 185 is adjusted to cause the jelly pump 156 to deposit jelly in small amounts simultaneously in the centers of two rows of advancing cookies.

When these two rows of cookies with jelly thereon have advanced to positions beneath the nozzle groups of the marshmallow hopper C, the valve and cut-off control handle 315 may be thrown in to initiate operation of the valves in the hopper C, thereby causing the pumps 280 to deposit marshmallow on top of the previously jellied units.

Referring now to Fig. 14, it will be understood that as the carriage reaches the point $d$ on its backward stroke, the cut-off plates 154 and 254 of both hoppers will be moved to open position and the valves 270 of hopper C will be lowered to the position shown in Fig. 11, contacting the bottom of hopper C. Then the carriage will drop from $d$ to $a$, as cam follower 51 follows cam 50. The forward stroke of the carriage from $a$ to $b$ then continues, and during this motion, depending upon the adjustment of jelly hopper cam 178 and the marshmallow hopper cam 336, the pumps will move downwardly to deposit confectionery simultaneously on four different rows of cookies, the nozzles gradually rising with the carriage as the deposits increase in size. As the carriage reaches point $b$ in its path, the cut-off plates will close and the marshmallow hopper valves 270 will rise. The cam 50 will then cause a rapid rise of the carriage from $b$ to $c$ to sever the deposits. As the carriage returns from $c$ to $d$, the pumps will rise again and the cycle will recommence.

As previously described, the initial distance of the carriage from the belt at the point $a$ may be varied by adjusting the handwheel 70, and the distance at point $b$ may be varied by adjustment through the handwheel 80.

As the carriage passes point $a$, its speed is such that the nozzles of both hoppers B and C move along the belt at the same horizontal speed as the units, but rise away from the units as the marshmallow deposits increase to the size shown in Fig. 10. By the time the hopper carriage has returned to the point $a$ in its path, the belt will have advanced a distance equivalent to twice the distance between the cookie centers, so as to bring the next two rows of cookies in position beneath the nozzles for the next depositing operation. The double rows of nozzles with each hopper permit a longer and thus a larger depositing operation without requiring wide spaces between the advancing cookies. In fact, the forward stroke of the carriage is approximately equivalent to the distance between centers of the units, and in the machine shown the horizontal traverse of the carriage is four inches in length, as is the distance between the cookies, and the distance between the rows of nozzles on each hopper.

As previously stated, Figs. 7, 8, 9, 10 and 11, for clearness, show the hopper carriage approximately at the completion of its backward stroke, that is at point $d$ in Fig. 14, while Figs. 1, 2 and 3 show the carriage approximately at the point $a$ in Fig. 14.

As the units with deposits on them pass under wiper E, every two rows is wiped, the wiping mechanism wiping once every cycle, and as the cookies reach the end of the belt reach, they may be passed onto an adjoining conveyor.

Where it is desired to include in the output two different kinds of products, the nozzle element 250 may be dispensed with, and an ordinary straight nozzle element may be substituted therefor. In such case, one row of cookies will receive one color of marshmallow, and the next row will receive a different color. Or, in some instances, the partition 256 can be removed from the hopper, with the result that the same kind of marshmallow will be deposited on all the advancing cookies. In this latter case, there is no reason why the multiple nozzle elements and the bar 250 may not be retained, even though they are not essential.

Having thus described my invention, I claim:

1. In a confectionery depositing machine of the class described which includes an endless conveyor and means for continuously advancing said conveyor at a predetermined uniform speed along a fixed plane, in combination, a hopper carriage mounted adjacent said plane for movement along a path diverging away from said plane in the direction of the conveyor advance, means for cyclically advancing said carriage along said path with a motion having a component parallel to said plane, the speed of which is substantially the same as said predetermined speed, a hopper mounted on said carriage, and means for depositing confectionery during the advance of said carriage along said diverging path onto units advancing on said conveyor.

2. In a confectionery depositing machine of the class described which includes an endless conveyor and means for continuously advancing said conveyor at a predetermined uniform speed along a fixed plane, in combination, a nozzle mounted adjacent said plane for movement along a path diverging away from said plane in the direction of the conveyor advance, means for cyclically advancing said nozzle along said path with a motion having a component parallel to said plane, the speed of which is substantially the same as said predetermined speed, a hopper associated with said nozzle, and means for depositing confectionery from said hopper during the advance of said nozzle along said diverging path through said nozzle onto a unit advancing on said conveyor.

3. In a confectionery depositing machine of the class described which includes an endless conveyor having a substantially horizontal reach and means for advancing said conveyor at a constant speed, in combination, a hopper carriage mounted over said reach for movement along a path upwardly inclined with relation to said reach, a hopper fixedly mounted on said carriage, nozzles associated with said hopper, and means for cyclically advancing said carriage along said path with a motion which has a horizontal component substantially the same in speed and direction as the motion of said conveyor on said reach.

4. In a confectionery depositing machine of the class described which includes an endless conveyor having a substantially horizontal reach and means for advancing said conveyor at a constant speed, in combination, a hopper carriage mounted over said reach for movement along a path having a substantially straight line traverse adjacent said reach and upwardly inclined with relation thereto, a hopper mounted on said carriage, nozzles associated with said hopper, and means for cyclically advancing said carriage along said traverse with a motion which has a horizontal component substantially the same in speed and direction as the motion of said conveyor on said reach.

5. In a confectionery depositing machine of the class described which includes an endless conveyor having a substantially horizontal reach and means for advancing said conveyor at a constant speed, in combination, a hopper carriage mounted over said reach for movement along an orbital path having an upwardly inclined traverse adjacent said reach, a hopper fixedly mounted on said carriage, nozzles associated with said hopper, and means for cyclically advancing said carriage along said traverse with a motion which has a horizontal component substantially the same in speed and direction as the motion of said conveyor on said reach.

6. In a confectionery depositing machine of the class described which includes an endless conveyor having a substantially horizontal reach and means for advancing said conveyor at a constant speed, in combination, a hopper carriage mounted over said reach for movement along a path upwardly inclined with relation to said reach, a hopper fixedly mounted on said carriage, nozzles associated with said hopper, means for cyclically advancing said carriage along said path with a motion which has a horizontal component substantially the same in speed and direction as the motion of said conveyor on said reach, and means for varying the path of movement of said hopper carriage relative to said reach.

7. In a confectionery depositing machine of the class described which includes an endless conveyor having a substantially horizontal reach and means for advancing said conveyor at a constant speed, in combination, a hopper carriage mounted for movement along an orbital path having an upwardly inclined substantially straight line traverse adjacent said reach, a hopper mounted on said carriage, nozzles associated with said hopper, and means for cyclically advancing said carriage along said traverse with a motion which has a horizontal component substantially the same in speed and direction as the motion of said conveyor on said reach, and means for varying the inclination of said traverse relative to said reach.

8. In a confectionery depositing machine of the class described which includes an endless conveyor and means for continuously advancing said conveyor at a predetermined uniform speed along a path disposed in a fixed substantially horizontal plane, in combination, a hopper carriage mounted over said plane for movement along an orbital path disposed in a plane parallel to the direction of the conveyor advance, a hopper mounted on said carriage, feeding means associated with said hopper for depositing confectionery from said hopper onto units positioned on said conveyor, a control plate mounted adjacent said conveyor, means for advancing said carriage along said orbital path and with a motion in the direction of advance of said conveyor having a horizontal component the speed of which is substantially the same as said predetermined speed and cooperating control means on said control plate and said carriage for controlling the operation of said feeding means to deposit confectionery while said carriage advances in said direction.

9. In a confectionery depositing machine of the class described which includes an endless conveyor and means for continuously advancing said conveyor at a predetermined uniform speed along a path disposed in a fixed substantially horizontal plane, in combination, a hopper carriage mounted over said plane for movement along an orbital path disposed in a plane parallel to the direction of the conveyor advance, means for advancing said carriage along said orbital path and with a motion in the direction of advance of said conveyor having a horizontal component the speed of which is substantially the same as said predetermined speed, a hopper mounted on said carriage, and means for depositing confectionery from said hopper during the advance of said carriage in said direction onto units advancing on said conveyor.

10. In a confectionery depositing machine of the class described which includes an endless conveyor and means for continuously advancing said conveyor at a predetermined uniform speed along a fixed substantially horizontal plane, in combination, a hopper carriage mounted over said plane for movement along a path diverging away from said plane in the direction of advance of said conveyor, means for cyclically advancing said carriage along said path with a motion having a horizontal component the speed of which is substantially the same as said predetermined speed, a hopper mounted on said carriage, and means for depositing confectionery during the advance of said carriage along said diverging path onto units advancing on said conveyor.

11. In a confectionery depositing machine which includes an endless conveyor adapted to support edible units, means for advancing said conveyor at a constant speed, and means for successively positioning edible units on said conveyor at predetermined equidistant intervals longitudinally thereof, in combination, a hopper carriage mounted over said conveyor for movement in a path upwardly inclined relative to said conveyor and extending along said conveyor at least the distance of said predetermined interval, a plurality of nozzles fixedly mounted on said carriage, means for cyclically advancing said carriage along said path, and means for periodically opening and closing said nozzles.

12. In a confectionery depositing machine which includes an endless conveyor adapted to support edible units, means for advancing said conveyor at a constant speed, and means for successively positioning edible units on said conveyor at predetermined equidistant intervals longitudinally thereof, in combination, a hopper carriage mounted over said conveyor for movement in a path upwardly inclined relative to said conveyor and extending along said conveyor at least the distance of said predetermined interval, a plurality of nozzles fixedly mounted on said carriage, means for cyclically advancing said carriage along said path with a motion which has a horizontal component substantially the same in speed and direction as the motion of units positioned on said conveyor, and means for periodically opening and closing said nozzles.

13. In a confectionery depositing machine which includes an endless conveyor adapted to support edible units, means for advancing said conveyor at a constant speed, and means for successively positioning edible units on said conveyor at predetermined equidistant intervals longitudinally thereof, in combination, a plurality of discharge nozzles for confectionery mounted for movement in orbital paths spaced from one another along said conveyor and means for moving said nozzles one complete cycle around said paths while units positioned on said conveyor advance a distance at least equal to two of said intervals, and means for periodically opening and closing said nozzles during each cycle.

14. In a confectionery depositing machine having an endless conveyor and means for advancing said conveyor, in combination, a hopper carriage mounted over said conveyor for movement along a path diverging away from said conveyor from a point adjacent said conveyor to a point relatively remote from said conveyor, a hopper mounted on said carriage, means for cyclically advancing said carriage along said path, feeding means for depositing confectionery from said hopper during movement of said carriage between said points onto units advancing on said conveyor, and means for adjusting said carriage moving means to vary the distance of said two points from said conveyor independently of each other.

15. In a confectionery depositing machine having an endless conveyor and means for advancing said conveyor, in combination, a hopper carriage mounted over said conveyor for movement along a path diverging away from said conveyor from a point adjacent said conveyor to a point relatively remote from said conveyor, a hopper mounted on said carriage, means for cyclically advancing said carriage along said path, feeding means for depositing confectionery from said hopper during movement of said carriage between said points onto units advancing on said conveyor, and means for adjusting said carriage moving means to vary the distance of said adjacent point of said path from said conveyor.

16. In a confectionery depositing machine having an endless conveyor and means for advancing said conveyor, in combination, a hopper carriage mounted over said conveyor for movement along a path diverging away from said conveyor from a point adjacent said conveyor to a point relatively remote from said conveyor, a hopper mounted on said carriage, means for cyclically advancing said carriage along said path, feeding means for depositing confectionery from said hopper during movement of said carriage between said points onto units advancing on said conveyor, and means for adjusting said carriage moving means to vary the distance of said relatively remote point of said path from said conveyor.

17. In a confectionery depositing machine having an endless conveyor and means for advancing said conveyor, in combination, a hopper carriage mounted over said conveyor for movement along a path diverging away from said conveyor from a point adjacent said conveyor to a point relatively remote from said conveyor, a hopper mounted on said carriage, means for cyclically advancing said carriage along said path, feeding means for depositing confectionery from said hopper during movement of said carriage between said points onto units advancing on said conveyor, and means for adjusting said carriage moving means to vary the distance of said adjacent point of said path from said conveyor, and means for adjusting said carriage moving means to vary the distance of said relatively remote point of said path from said conveyor.

18. In a confectionery depositing machine having an endless conveyor and means for advancing said conveyor, in combination, a hopper carriage mounted over said conveyor for movement along a path upwardly inclined with relation to said conveyor, means for cyclically advancing said carriage along said path, feeding means mounted on said carriage for periodically depositing confectionery onto units positioned on said conveyor, a control plate mounted for vertical movement relative to said conveyor, but held against movement longitudinally thereof, means for raising and lowering said control plate in unison with vertical movement of said carriage, and cooperating control means on said control plate and said carriage for controlling the operation of said feeding means to deposit confectionery during advance of said carriage along said inclined path.

19. In a confectionery depositing machine having an endless conveyor and means for advancing said conveyor, in combination, a floating hopper carriage mounted over said conveyor for movement along an orbital path disposed in a plane normal to said conveyor plane, means for advancing said carriage along said path, and spring carriage supporting means for relieving said carriage advancing means of a portion of the weight of said carriage.

20. In a confectionery depositing machine having an endless conveyor and means for advancing said conveyor, in combination, a hopper carriage mounted over said conveyor for movement along a path upwardly inclined relative to said conveyor, means for cyclically advancing said carriage along said path, a hopper mounted on said carriage, a nozzle associated with said hopper, a cut-off element for periodically closing said nozzle, a reciprocating pump for feeding material from said hopper through said nozzle, a control plate mounted adjacent said conveyor, cooperating control means on said plate and said carriage for controlling the operation of said pump and said cut-off element, and means for varying the throw of said pump.

21. In a confectionery depositing machine having an endless conveyor and means for advancing said conveyor, in combination, a hopper carriage mounted over said conveyor for movement along said conveyor, means for cyclically advancing said carriage along said conveyor, a hopper mounted on said carriage, a plurality of nozzles associated with said hopper, reciprocating pumps for feeding material from said hopper through said nozzles, a control plate mounted adjacent said conveyor, and cooperating control means on said plate and said carriage for controlling the reciprocation of said pumps including means for varying the throw of said pumps independently of one another.

JESSE W. GREER.